United States Patent
Dehennau et al.

(10) Patent No.: US 7,093,620 B2
(45) Date of Patent: Aug. 22, 2006

(54) REINFORCED PLASTIC PIPE AND PROCESS FOR MANUFACTURING THE SAID PIPE

(75) Inventors: Claude Dehennau, Waterloo (BE); Pierre Matz, Nil Saint-Vincent (BE)

(73) Assignee: Solvay, Brussels (BE)

( * ) Notice: Subject to any disclaimer, the term of this patent is extended or adjusted under 35 U.S.C. 154(b) by 453 days.

(21) Appl. No.: 10/475,759

(22) PCT Filed: Apr. 26, 2002

(86) PCT No.: PCT/EP02/04849

§ 371 (c)(1),
(2), (4) Date: Oct. 24, 2003

(87) PCT Pub. No.: WO02/088589

PCT Pub. Date: Nov. 7, 2002

(65) Prior Publication Data

US 2004/0118471 A1    Jun. 24, 2004

(30) Foreign Application Priority Data

Apr. 27, 2001    (BE) .................................. 2001/0291

(51) Int. Cl.
*F16L 11/00*    (2006.01)

(52) U.S. Cl. ...................... 138/123; 138/130; 138/129; 138/144; 156/188; 156/149; 428/36.91

(58) Field of Classification Search ................ 138/123, 138/125, 130, 129, 144; 428/36.1, 36.3, 428/36.9, 36.91; 156/188, 148, 149, 187
See application file for complete search history.

(56) References Cited

U.S. PATENT DOCUMENTS

| | | | | |
|---|---|---|---|---|
| 2,783,173 | A | * 2/1957 | Walker et al. | 156/190 |
| 3,847,693 | A | * 11/1974 | Ghersa et al. | 156/79 |
| 4,093,004 | A | 6/1978 | Kile et al. | 138/140 |
| 4,262,704 | A | * 4/1981 | Grawey | 138/130 |
| 4,266,579 | A | * 5/1981 | Deiss | 138/127 |
| 4,347,090 | A | * 8/1982 | Anderson et al. | 156/149 |
| 5,188,872 | A | * 2/1993 | Quigley | 428/36.2 |
| 5,277,973 | A | * 1/1994 | Yamamura et al. | 428/367 |
| RE35,081 | E | * 11/1995 | Quigley | 428/36.2 |
| 6,382,258 | B1 | * 5/2002 | Tanaka | 138/130 |
| 6,629,547 | B1 | * 10/2003 | Yamaguchi et al. | 138/129 |

FOREIGN PATENT DOCUMENTS

| | | |
|---|---|---|
| EP | 0 697 553 | 2/1996 |
| WO | 92 01885 | 2/1992 |
| WO | 99 08033 | 2/1999 |

* cited by examiner

*Primary Examiner*—Patrick Brinson
(74) *Attorney, Agent, or Firm*—Oblon, Spivak, McClelland, Maier & Neustadt, P.C.

(57) ABSTRACT

Reinforced pipe obtained by winding, onto a tubular support based on a polymeric composition, of reinforcing tapes comprising an oriented polymeric composition in layers crossed at an equal but opposite angle relative to the axis of the pipe. The tapes are selected from those whose polymeric composition exhibits particular mechanical strength properties in tension.

9 Claims, No Drawings

REINFORCED PLASTIC PIPE AND PROCESS FOR MANUFACTURING THE SAID PIPE

The present invention relates to a plastic pipe reinforced in order to withstand mechanical stress.

Pipes that have to withstand high mechanical stresses, such as large-diameter pipes and/or pipes subjected to high internal pressure, can be economically produced from ductile cast iron. However, plastic pipes are preferred in a number of cases to cast iron because they are much lighter and they exhibit remarkable corrosion resistance.

In order to withstand high mechanical stresses as well as cast iron, conventional plastic pipes must have a greater wall thickness, which increases the cost and makes them less competitive compared with ductile cast iron pipes.

Moreover, plastic pipes often have a low creep resistance under prolonged stress. However, it is very important, in the case of certain types of use, for the strength of these pipes, for example the burst strength, not to degrade after a long period of use, which may sometimes extend to several decades.

Several approaches have been envisaged for solving this problem. The first approach consisted in producing pipes whose plastic is biaxially oriented in the directions parallel and perpendicular to the axis of the pipe.

However, the biaxial orientation operation can be carried out only on the pipe preformed by extrusion, making the process a batch process and increasing the cost thereof. Moreover, to maintain the biaxial orientation of the material during the fitting of couplers means that particular precautions, involving the use of many special couplers, have to be taken. Moreover, the reinforcement obtained using this technique is most particularly effective in the longitudinal direction, but only very partially solves the problem of resistance to the radial forces that represent the maximum stresses in some applications, for example the transportation of pressurized fluids. Hitherto, the endeavours to make the biaxial orientation process continuous have not yet fully borne fruit because of the technological constraints and the substantial cost burden that they entail, compared with the still insufficient increase in strength obtained.

Another approach has been to place reinforcements on plastic pipes, such as for example a continuous winding of fibres (for example glass fibres) impregnated with a thermoplastic or thermosetting resin (COFITS). However, this approach is not without drawbacks either, as these windings are generally brittle and greatly increase the density of the resulting reinforced pipe and its cost. Moreover, the effectiveness of these reinforcements does not always remain constant over time and it is often difficult to recycle scrap pipe at the end of life, because of the incorporation into the polymer of the pipe of foreign matter difficult to separate.

Also known is U.S. Pat. No. 4,093,004 which discloses the principle of reinforcing supports made of various materials (board, paper, rubber, wood or plastic) by means of oriented polyolefin tapes. However, the reinforced pipe obtained does not have sufficient strength, particularly burst strength to be used safely over long periods for the transportation of pressurized fluids.

The object of the invention is to solve the problems posed by the abovementioned known reinforcing systems, while maintaining the production cost within limits that are acceptable and competitive with ductile cast iron pipes.

For this purpose, the invention relates to a reinforced multilayer plastic pipe formed from a tubular support based on a polymeric composition, onto which support are wound reinforcing tapes comprising an oriented polymeric composition, in which pipe the tapes are selected from those which satisfy the following relationship:

$$\frac{SI}{SI_0} \geq 4$$

where:
SI is a strength index of the reinforcing tape, calculated as follows:

$$SI = \frac{\sigma}{\sqrt[3]{E}}$$

with:
σ representing the maximum value of the stress reached during a tensile test on the tapes in the orientation direction, for an elongation corresponding to the yield point of the support or, otherwise, to the break point of the tape if the elongation at this break point is less than that of the elongation at the yield point of the support;
E being the tensile elastic modulus of the oriented tapes;

$$SI_0 = \frac{\sigma_0}{\sqrt[3]{E_0}}$$

being the strength index of the support;
and
$\sigma_0$ and $E_0$ being the stress at the yield point and the tensile elastic modulus of the support, respectively, in which σ, E, $\sigma_0$ and $E_0$ are expressed in the same arbitrary tension units;
and which pipe comprises at least two layers of tapes wound onto the support, each layer being formed from tapes making a similar angle, but of opposite sign, with the tapes of the other layer relative to the axis of the pipe.

In this definition, the term "similar angle" means an angle at least equal to the same angle less 5 degrees of angle. The term "similar angle" also includes an angle at most equal to the same angle plus 5 degrees of angle. Preferably, this term means an angle at least equal to the same angle less 2 degrees of angle. Also preferably, it includes an angle at most equal to the same angle plus 2 degrees of angle.

The term "yield point" denotes the point on the load-elongation curve in a tensile test carried out on the plastic in question above which the load to be applied needed to obtain further elongation starts to drop relative to the loads required to obtain elongations below that corresponding to this point.

The term "reinforced pipe" is understood to mean a pipe of which the intrinsic mechanical properties of the base material composition of which the pipe is composed are modified by the presence of an additional material composition that differs from this base material and, by its presence, increases the mechanical strength. The base material composition is a polymeric composition that represents at least 40% by weight of the total weight of the reinforced pipe. The support is formed from the base polymeric composition. The additional material composition is formed by the reinforcing tapes.

The term "plastic" is understood to mean any material comprising at least one polymer made of synthetic resin.

All types of plastic may be suitable. Plastics that are very suitable fall within the thermoplastics category.

The term "thermoplastic" denotes any thermoplastic polymer, including thermoplastic elastomers, and blends thereof. The term "polymer" denotes both homopolymers and copolymers (especially binary or ternary copolymers). Examples of such copolymers are, in a non-limiting manner: random copolymers, block copolymers and graft copolymers.

Any type of thermoplastic polymer or copolymer whose melting point is below the decomposition temperature is suitable. Synthetic thermoplastics that have a melting range spread over at least 10 degrees Celsius are particularly suitable. Examples of such materials include those that exhibit polydispersity in their molecular weight.

In particular, polyolefins, polyvinyl halides, thermoplastic polyesters, polyketones, polyamides and copolymers thereof may be used. A blend of polymers or copolymers may also be used, as may a blend of polymeric materials with inorganic, organic and/or natural fillers such as, for example, but non-limitingly, carbon, salts and other inorganic derivatives, natural or polymeric fibres. It is also possible to use multi-layer structures consisting of stacked layers bonded together, comprising at least one of the polymers or copolymers described above.

A polymer often employed is polyethylene. Excellent results have been obtained with high-density polyethylene (HDPE).

The base constituent of the reinforced pipe according to the invention is a tubular support, that is to say a hollow object in the form of a tube. It is formed, at least partly, from a polymeric composition.

Other constituents of the reinforced pipe according to the invention are the reinforcing tapes that comprise an additional material composition providing the increased mechanical strength needed to give the reinforced pipe the mechanical properties suitable for the use to which it will be put.

The additional material present in the reinforcing tapes of the pipe according to the invention comprise at least one oriented polymeric composition. It may comprise a single oriented polymeric composition. Alternatively, it may also comprise a blend of several polymeric compositions and optionally of non-polymeric additives, at least one of the polymers of which is oriented. The polymer may be any thermoplastic polymer that can be present in the tapes in oriented form, that is to say a thermoplastic polymer having at least 20% by weight of its constituent molecular chains lying in the same direction. Preferably, the direction of orientation is that of the length of the tape. Any type of thermoplastic polymer lending itself well to its molecular chains being oriented may be chosen for the oriented polymer. In general, an oriented polymer whose nature is the same as that of the polymers commonly used for producing pipes that have to withstand pressure is used. Advantageous examples of such polymers in the case of a support made of high-density polyethylene (HDPE) are, non-limitingly, multimodal HDPE resins and crosslinkable resins.

Multimodal resins are those that have a molecular weight distribution exhibiting several extrema. Bimodal HDPE resins, with two extrema, are preferred.

Crosslinkable HDPE resins are HDPE resins that, while they are being processed, behave like conventional thermoplastic HDPE resins and can then, after being formed, be crosslinked and cured by any process (the action of peroxides, irradiation, etc.).

If several oriented polymers are present, they share the same direction of orientation. The oriented polymer of the tapes may be of the same nature as one of the polymers of the base polymeric composition of which the support is made. However, it may also be a polymer not present in this base polymeric composition if the circumstances of use so require or if they are not very compatible with the use of an identical polymer.

Advantageously, the reinforced pipe according to the invention comprises an even number of layers of reinforcing tapes wound onto the support.

Preferably, an adhesive layer is inserted between the support and the adjacent tape layer, and between each tape layer.

The term "adhesive" is understood to mean any adhesive compatible with the composition of the support and that of the reinforcing tapes. The adhesive most commonly employed is generally a polymer adhesive that may be in the form of a polyurethane or a functionalized polyolefin. The term "functionalized polyolefin" is understood to mean any polyolefin comprising, in addition to the units derived from olefins, functional monomeric units. These may be incorporated either into the main chain of the polyolefin or into its side chains. They may also be incorporated directly into the backbone of these main and side chains, for example by the copolymerization of one or more functional monomers with the olefinic monomer(s), or else they may result from the grafting of one or more functional monomers onto said chains, after the polyolefin has been manufactured. Several functionalized polyolefins may also be used as a blend.

The functional monomeric units of the functionalized polyolefin are chosen from carboxylic acids, dicarboxylic acids and the anhydrides corresponding to these diacids. These monomeric units generally derive from the copolymerization or the grafting of at least one unsaturated monomer possessing the same functional groups. Non-limiting examples of monomers that can be used are acrylic acid, methacrylic acid, maleic acid, fumaric acid, itaconic acid, maleic anhydride, fumaric anhydride and itaconic anhydride. Preferably, the functional monomeric units derive from the copolymerization or grafting of maleic anhydride.

Preferably, the number of layers and the angles of the reinforcing tapes are chosen in such a way as to give the finished pipe a strength at least sufficient to allow it to sustainably withstand the stresses exerted.

The reinforced pipe will in general comprise at least two reinforcing tape layers. When it comprises two tape layers, these make between them, relative to the axis of the pipe, a similar angle but of opposite sign. The term "similar" here has the same meaning as that explained above.

When the reinforced pipe comprises more than two reinforcing tape layers, any two adjacent layers of this pipe preferably take a similar angle, but of opposite sign, to the axis of the pipe.

According to one particular advantageous embodiment of the invention, the reinforcing tapes of the pipe are wound with touching turns. More advantageously, these reinforcing tapes are also protected by two unoriented polymeric layers. The term "protected" is understood here in the sense of mechanical protection against any impairment of mechanical origin that would result from external environmental stresses on the reinforced pipe. Preferably, the polymeric composition of these protective layers is compatible with the oriented polymeric composition of the reinforcing layers. Also preferably, the first of these protective layers, that which is innermost, is formed from tapes that are also wound with touching turns. Advantageously, the second protective layer, located around the external periphery of the reinforced pipe is a tubular solid layer formed from a single piece and serving as a top coat. The expression "polymeric composition compatible with an oriented polymeric composition" is understood to mean any polymeric composition, miscible in the melt with this oriented composition, that causes no undesirable physical or chemical reaction capable of affecting the orientation of at least one polymer of the said oriented polymeric composition.

It is also particularly advantageous for the nature of each of the constituents of the pipe to be judiciously chosen for the purpose of allowing it to be recycled and reused, as a blend in one of the layers of a new pipe. This capability should in this case be able to be guaranteed both when manufacturing a new pipe (by using manufacturing fragments) and when recycling a spent pipe, at the end of its period of use.

The invention also relates to a process for the production of a reinforced plastic pipe comprising the application, by winding around a tubular support based on a polymeric composition, of reinforcing tapes comprising an oriented polymeric composition, characterized in that the tapes are selected from those that satisfy the following relationship:

$$\frac{SI}{SI_0} \geq 4$$

where:

SI is a strength index of the reinforcing tape, calculated as follows:

$$SI = \frac{\sigma}{\sqrt[3]{E}}$$

with:

σ representing the maximum value of the stress reached during a tensile test on the tapes in the orientation direction, for an elongation corresponding to the yield point of the support or, otherwise, to the break point of the tape if the elongation at this break point is less than that of the elongation at the yield point of the support;

E being the tensile elastic modulus of the oriented tapes;

$$SI_0 = \frac{\sigma_0}{\sqrt[3]{E_0}}$$

being the strength index of the support; and $\sigma_0$ and $E_0$ being the stress at the yield point and the tensile elastic modulus of the support, respectively, in which σ, E, $\sigma_0$ and $E_0$ are expressed in the same arbitrary tension units;

and in that it comprises at least two layers of tapes wound onto the support, each layer being formed from tapes making a similar angle, but of opposite sign, with the tapes of the other layer relative to the axis of the pipe. The yield point and the term "similar" have the same meanings here as those already explained above in respect of the reinforced pipe.

The reinforcing tapes may be bonded to the support and/or to the subjacent tape layer by means of an adhesive. The adhesives used are the same as those described above in respect of the reinforced pipe.

According to one particular method of carrying out the process according to the invention, the reinforcing tapes used are precoated by means of a heat-activated adhesive.

Using an adhesive of this type offers the advantage of limiting the duration of heating of the reinforcing tapes to that strictly necessary for developing the adhesive effect, so as far as possible to preserve the orientation of the polymeric composition of the reinforcing tapes, which property is generally known to degrade under the effect of heat.

In this particular method of implementing the process according to the invention, it is also possible to further improve the protection of the molecular orientation of the polymer of the composition of the reinforcing tapes by winding, on top of the latter, a thin heat shield tape that comprises an unoriented polymeric composition of chemical nature compatible with that of the oriented polymeric composition of the subjacent layers. These protective tapes are bonded to the oriented tapes by means of a solventless organic adhesive or by means of a polymer adhesive that melts at a temperature low enough not to impair the orientation of the molecules of these oriented reinforcing tapes.

The thickness of this tape depends on the magnitude of its heat shield properties and does not exceed that which allows relatively good stability of the molecular orientation of the subjacent layers. It is also advantageous for this heat shield tape to be highly transparent to infrared radiation so as to allow the adhesive to be activated via radiation of this type, to the exclusion of other heat sources.

In a variant of the particular process according to the invention, an external top coat is deposited using an extrusion-coating technique over the thin heat shield tape, the said top coat comprising an unoriented polymeric composition compatible with that of the subjacent thin heat shield tape. This may advantageously be deposited using a circular die surrounding the reinforced pipe, through which die the top coat is made to flow.

The external top coat has the purpose of precisely sizing the external dimensions of the pipe and of allowing compatibility with couplings fitted by adhesive bonding or by heat welding.

Advantageously, the thickness of the thin tape is adjusted so that it acts as an effective heat shield, as explained above, during the extrusion-coating of the top coat so as to minimize the loss of orientation of the oriented polymeric composition of the reinforcing tapes.

The examples that follow are given for the purpose of illustrating the invention without in any way limiting its scope.

Tensile strength measurements and elastic modulus were compared for four different polymers that were used to manufacture tapes 0.9 mm in thickness. These tapes were wound around a tubular support made of high-density polyethylene (HDPE) with a wall thickness of 3.85 mm (hereafter called TUB 121). Two crossed layers of each of these tapes were applied to the support, making an angle of +55 degrees and −55 degrees relative to the axis of the support, except in the case of the "Leedsl"-type crystalline HDPE polymer in which four tape layers (making the same angles as the tapes of the other pipes) were needed to produce a coherent winding. In the case of this latter, crystalline HDPE, polymer, the necessary investment that has to be made for the winding device is twice that of the other polymers examined.

The instantaneous burst pressure of the pipe was then measured according to the ISO 9080 standard.

The results obtained are given in the following table.

| Trial No. | Type of pipe/tapes | Strength σ (MPa) | Tensile elastic modulus (MPa) | SI/ SI$_0$ | Burst pressure (bar) |
|---|---|---|---|---|---|
| 1R | TUB121/none (unreinforced support) | 25 | 1000 | 1.0 | 40 |
| 2R | TUB121/melt-oriented HDPE | 25 | 424 | 1.3 | 40 |
| 3 | TUB121/11-3 oriented HDPE | 153 | 1741 | 5.1 | 100 |
| 4 | TUB121/K17 oriented HDPE | 220 | 2545 | 6.4 | 135 |
| 5R | TUB121/Leeds1 | 147 | 10209 | 2.7 | 90 |

Trials 1R, 2R and 5R are control trials not in accordance with the invention. Trials 3 and 4 are according to the invention. It may be seen that the reinforced pipes produced in trials 3 and 4, which are the only ones in which the index ratio SI/SI$_0$ is greater than 4, exhibit optimum burst pressures, since they are the highest and meet the specifications required for the intended use as reinforced pipes.

What is claimed is:

1. A reinforced multilayer plastic pipe formed from a tubular support based on a polymeric composition, onto which support are wound reinforcing tapes comprising an oriented polymeric composition, wherein the tapes are selected from those that satisfy the following relationship:

$$\frac{SI}{SI_0} \geq 4$$

where:
SI is a strength index of the reinforcing tape, calculated as follows:

$$SI = \frac{\sigma}{\sqrt[3]{E}}$$

with:
σ representing the maximum value of the stress reached during a tensile test on the tapes in the orientation direction, for an elongation corresponding to the yield point of the support or, otherwise, to the break point of the tape if the elongation at this break point is less than that of the elongation at the yield point of the support;
E being the tensile elastic modulus of the oriented tapes;

$$SI_0 = \frac{\sigma_0}{\sqrt[3]{E_0}}$$

being the strength index of the support; and
σ$_0$ and E$_0$ being the stress at the yield point and the tensile elastic modulus of the support, respectively, in which σ, E, σ$_0$ and E$_0$ are expressed in the same arbitrary tension units;
and wherein it comprises at least two layers of tapes wound onto the support, each layer being formed from tapes making a similar angle, but of opposite sign, with the tapes of the other layer relative to the axis of the pipe.

2. The pipe according to claim 1, wherein it comprises an even number of reinforcing tape layers wound onto the support.

3. The pipe according to claim 1, wherein an adhesive layer is inserted between the support and the adjacent tape layer, and between each tape layer.

4. The pipe according to claim 1, wherein that the reinforcing tapes are protected by a thin first layer of tapes wound with touching turns, comprising an unoriented polymeric composition compatible with the oriented polymeric composition of the subjacent reinforcing layers and by a tubular solid external second layer formed from a single piece and having this same unoriented polymeric composition, serving as top coat.

5. A process for the production of a reinforced plastic pipe comprising the application, by winding around a tubular support based on a polymeric composition, of reinforcing tapes comprising an oriented polymeric composition, wherein the tapes are selected from those which satisfy the following relationship:

$$\frac{SI}{SI_0} \geq 4$$

SI is a strength index of the reinforcing tape, calculated as follows:

$$SI = \frac{\sigma}{\sqrt[3]{E}}$$

with:
σ representing the maximum value of the stress reached during a tensile test on the tapes in the orientation direction, for an elongation corresponding to the yield point of the support or, otherwise, to the break point of the tape if the elongation at this break point is less than that of the elongation at the yield point of the support;
E being the tensile elastic modulus of the oriented tapes;

$$SI_0 = \frac{\sigma_0}{\sqrt[3]{E_0}}$$

being the strength index of the support; and
σ$_0$ and E$_0$ being the stress at the yield point and the tensile elastic modulus of the support, respectively, in which σ, E, σ$_0$ and E$_0$ are expressed in the same arbitrary tension units;
and which comprises at least two layers of tapes wound onto the support, each layer being formed from tapes making a similar angle, but of opposite sign, with the tapes of the other layer relative to the axis of the pipe.

6. The process according to claim 5, wherein the reinforcing tapes used are precoated by means of a heat-activated adhesive.

7. The process according to claim 5, wherein it is carried out by winding, over the reinforcing tapes, a thin heat shield tape that comprises an unoriented polymeric composition of chemical composition compatible with that of the oriented polymeric composition of the subjacent reinforcing layers.

8. The process according to claim 7, wherein an external top coat is deposited using an extrusion-coating technique over the thin heat shield tape, the said top coat comprising an unoriented polymeric composition compatible with that of the subjacent thin heat shield tape, using a circular die through which the top coat flows.

9. The process according to claim 8, wherein the thickness of the thin tape is adjusted so as to act as an effective heat shield during the extrusion-coating of the top coat so as to minimize the loss of orientation of the oriented polymeric composition of the reinforcing tapes.

* * * * *

UNITED STATES PATENT AND TRADEMARK OFFICE
CERTIFICATE OF CORRECTION

| | | |
|---|---|---|
| PATENT NO. | : 7,093,620 B2 | Page 1 of 1 |
| APPLICATION NO. | : 10/475759 | |
| DATED | : August 22, 2006 | |
| INVENTOR(S) | : Claude Dehennau et al. | |

It is certified that error appears in the above-identified patent and that said Letters Patent is hereby corrected as shown below:

Column 8, lines 28-29, " SI is a strength index of the reinforcing tape, "

should read -- where:
              SI is a strength index of the reinforcing tape, --.

Signed and Sealed this

Third Day of April, 2007

JON W. DUDAS
*Director of the United States Patent and Trademark Office*